(12) United States Patent
Tabata et al.

(10) Patent No.: US 11,964,527 B2
(45) Date of Patent: Apr. 23, 2024

(54) STABILIZER SYSTEM

(71) Applicant: TOYOTA JIDOSHA KABUSHIKI KAISHA, Toyota (JP)

(72) Inventors: Masaaki Tabata, Nagoya (JP); Kazuyuki Murata, Toyota (JP); Masashi Yamamoto, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 386 days.

(21) Appl. No.: 17/381,296

(22) Filed: Jul. 21, 2021

(65) Prior Publication Data

US 2022/0032708 A1 Feb. 3, 2022

(30) Foreign Application Priority Data

Jul. 28, 2020 (JP) ................................. 2020-127430

(51) Int. Cl.
*B60G 17/016* (2006.01)
*B60G 17/019* (2006.01)
*B60G 21/055* (2006.01)

(52) U.S. Cl.
CPC ............ *B60G 17/0162* (2013.01); *B60G 17/01908* (2013.01); *B60G 21/0558* (2013.01);
(Continued)

(58) Field of Classification Search
CPC .......... B60G 17/0162; B60G 17/01908; B60G 21/0558; B60G 2202/135;
(Continued)

(56) References Cited

U.S. PATENT DOCUMENTS 8,165,749 B2 * 4/2012 Izawa ................ B60G 17/0152
280/5.506
2005/0079066 A1 4/2005 Tatsuya et al.
(Continued)

FOREIGN PATENT DOCUMENTS

CN 104786774 A 7/2015
JP 2004-136814 A 5/2004
(Continued)

*Primary Examiner* — Jacob M Amick
*Assistant Examiner* — Charles J Brauch
(74) *Attorney, Agent, or Firm* — Sughrue Mion, PLLC

(57) ABSTRACT

A vehicle stabilizer system, including: a stabilizer device and a switching mechanism to switch a roll suppressing function by a stabilizer bar between an effective state in which the roll suppressing function is rendered effective and an ineffective state in which the roll suppressing function is rendered ineffective; and a controller configured to determine whether a lateral acceleration of a vehicle body is greater than a threshold lateral acceleration and control the switching mechanism to render the roll suppressing function effective when the lateral acceleration is greater than the threshold lateral acceleration and ineffective when the lateral acceleration is not greater than the threshold lateral acceleration, wherein the controller employs, as a determination lateral acceleration for determining whether the lateral acceleration is greater than the threshold lateral acceleration, a smaller one of an actual lateral acceleration and an estimated lateral acceleration estimated based on a turning degree of the vehicle.

8 Claims, 6 Drawing Sheets

(52) U.S. Cl.
CPC .............. *B60G 2202/135* (2013.01); *B60G 2400/0533* (2013.01); *B60G 2400/104* (2013.01); *B60G 2400/412* (2013.01); *B60G 2800/016* (2013.01)

(58) Field of Classification Search
CPC ...... B60G 2400/0533; B60G 2400/104; B60G 2400/412; B60G 2800/016; B60G 17/016; B60G 17/0182
See application file for complete search history.

(56) References Cited

U.S. PATENT DOCUMENTS

2016/0200164 A1* 7/2016 Tabata ................. B60G 21/073
280/5.508
2020/0180386 A1 6/2020 Tabata et al.

FOREIGN PATENT DOCUMENTS

JP 2020-93619 A 6/2020
WO WO-2008066207 A1 * 6/2008 ......... B60G 21/0558

* cited by examiner

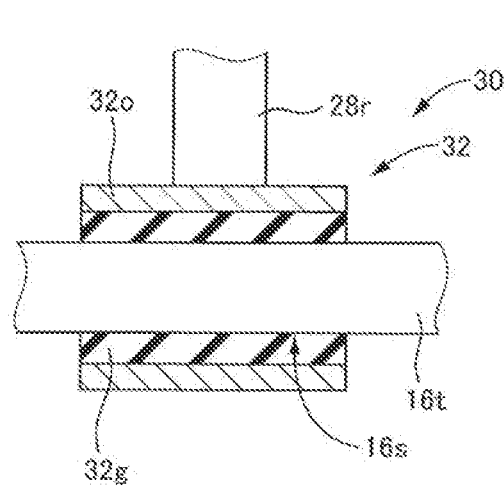
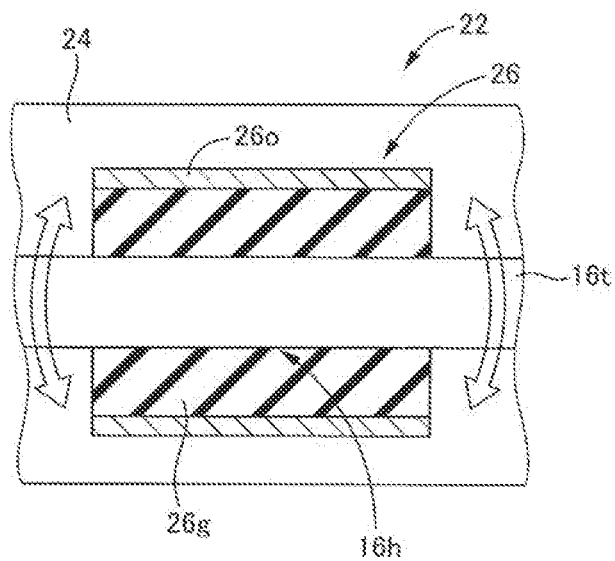
FIG.2B  FIG.2A
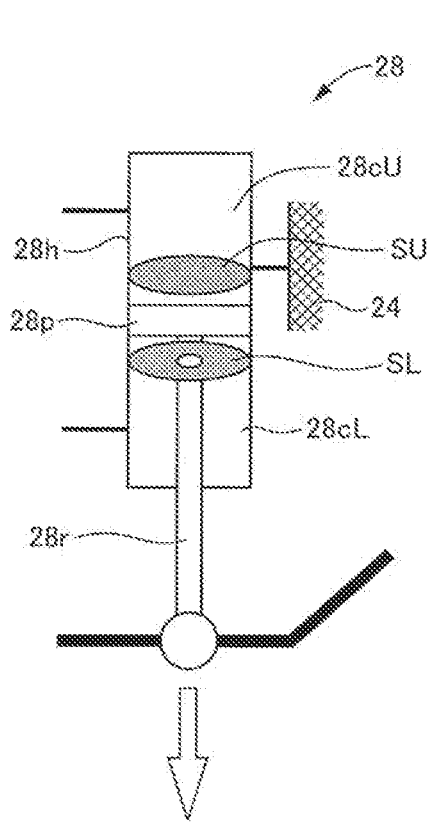
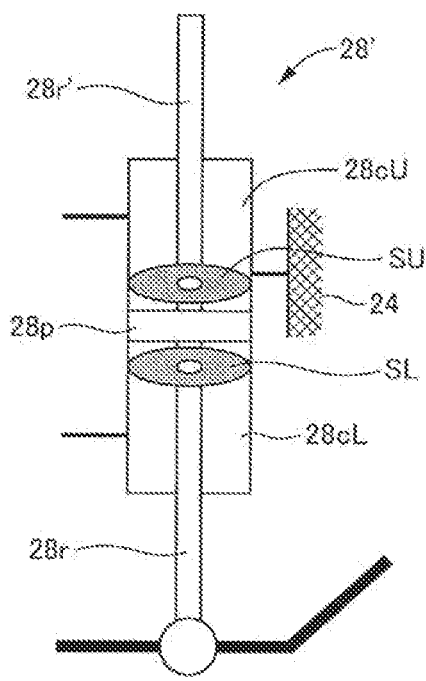
FIG.2C  FIG.2D

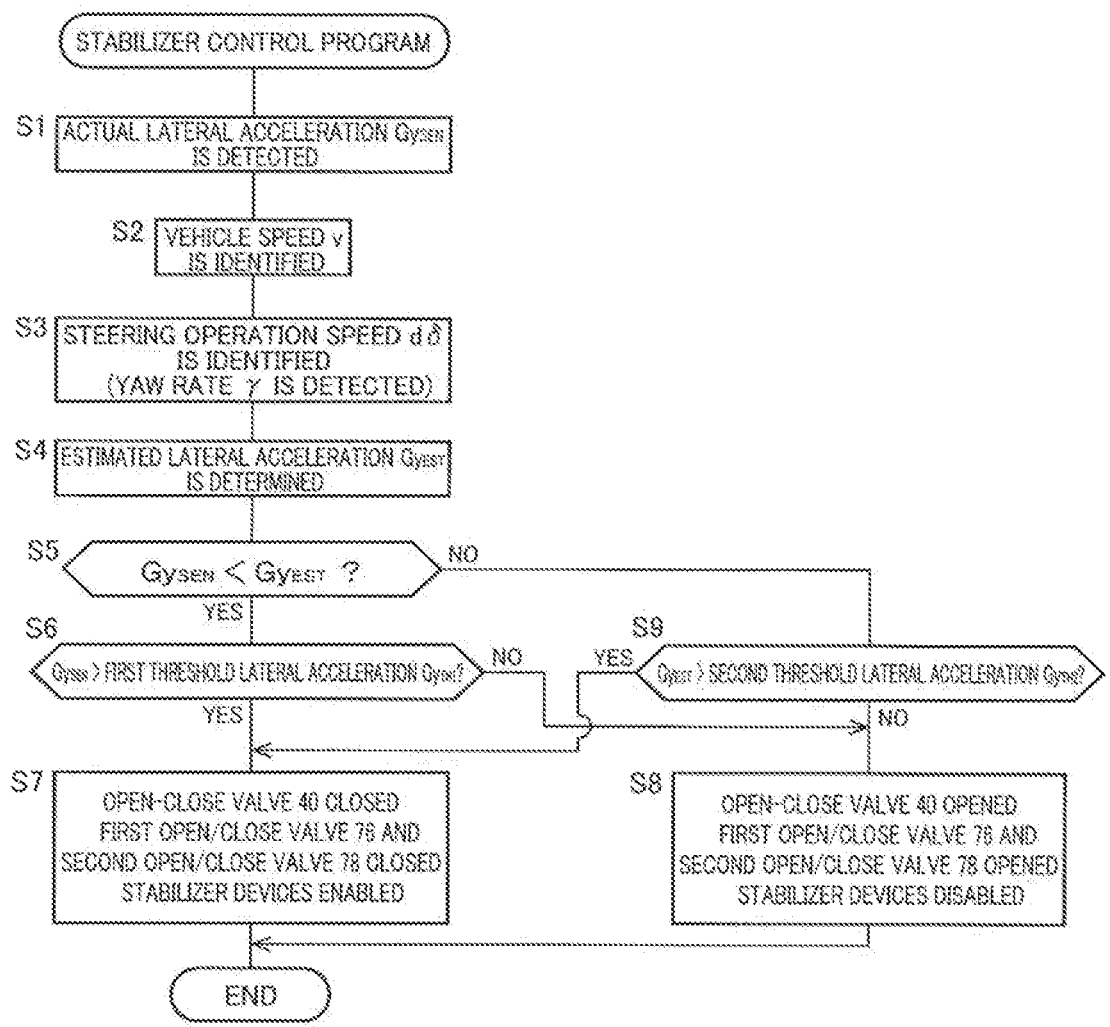

STABILIZER SYSTEM

CROSS REFERENCE TO RELATED APPLICATION

The present application claims priority to Japanese Patent Application No. 2020-127430, which was filed on Jul. 28, 2021, the disclosure of which is herein incorporated by reference in its entirety.

BACKGROUND

Technical Field

The following disclosure relates to a stabilizer system installed on a vehicle.

Description of Related Art

A stabilizer system includes a stabilizer device that includes a stabilizer bar as a main constituent element. In a stabilizer system described in Patent Document 1 (Japanese Patent Application Publication No. 2004-136814), for instance, the stabilizer device includes a hydraulic rotary actuator or a hydraulic cylinder, and a controller controls an electromagnetic open/close valve functioning as a switching mechanism, so as to control an effect of suppressing roll of a vehicle body exhibited by the stabilizer bar.

SUMMARY

In the stabilizer system described above, the controller mainly utilizes a lateral acceleration of the vehicle body for controlling the roll suppressing effect exhibited by the stabilizer bar. The stabilizer system, however, originally intends to suppress roll of the vehicle body that arises from tuning of the vehicle. The control merely based on an actual lateral acceleration of the vehicle body causes the roll suppressing effect by the stabilizer bar to be exhibited also with respect to roll of the vehicle body that arises from unevenness or irregularities of a road surface, thus adversely influencing riding comfort and stability of the vehicle. That is, appropriate control can enhance utility of the stabilizer system. Accordingly, an aspect of the present disclosure is directed to a stabilizer system with high utility.

In one aspect of the present disclosure, a stabilizer system for a vehicle including:
  a stabilizer device including a stabilizer bar and a switching mechanism configured to switch a roll suppressing function of suppressing roll of a body of the vehicle by the stabilizer bar between an effective state in which the roll suppressing function is rendered effective and an ineffective state in which the roll suppressing function is rendered ineffective; and
  a controller configured to determine whether a lateral acceleration of the body of the vehicle is greater than a threshold lateral acceleration and to control the switching mechanism to render the roll suppressing function effective when the lateral acceleration is greater than the threshold lateral acceleration and to render the roll suppressing function ineffective when the lateral acceleration is not greater than the threshold lateral acceleration,
  wherein the controller employs, as a determination lateral acceleration for determining whether the lateral acceleration is greater than the threshold lateral acceleration, a smaller one of an actual lateral acceleration and an estimated lateral acceleration estimated based on a degree of turning of the vehicle.

The stabilizer system intends to suppress or reduce roll of the vehicle body caused when the vehicle turns. Conversely, when the vehicle is driving off-road or driving on an undulating road, the roll suppressing function is desired not to work, in other words, the effect of suppressing roll (anti-roll effect) is desired not to be exhibited. The stabilizer system according to the present disclosure enables the roll suppressing function by the stabilizer bar not to work with respect to roll of the vehicle body that arises from unevenness or irregularities of the road surface. In a case where the vehicle is driving on a low-μ road with a small road surface μ, the vehicle may excessively turn with the lateral acceleration being not generated. The present stabilizer system enables the roll suppressing function by the stabilizer bar not to work also in such a case. Thus, the vehicle on which the present stabilizer system is installed is excellent in riding comfort and stability.

Various Forms

The stabilizer device of the stabilizer system according to the present disclosure is not limited to a particular configuration provided that the stabilizer device includes a stabilizer bar and the stabilizer bar applies, to the vehicle body, a roll suppressing force for suppressing roll of the vehicle body owing to a torsional reaction force. The switching mechanism for switching the roll suppressing function between the effective state and the ineffective state is not limited to a particular configuration. For instance, in a case where a hydraulic cylinder is interposed between: a wheel holding portion holding the wheel or the vehicle body; and the stabilizer bar, there may be employed a mechanism for selectively establishing a state in which the cylinder is allowed to extend and contract and a state in which the cylinder is not allowed to extend and contract. In such a configuration, the switching mechanism described above may be constituted so as to include an electromagnetic valve configured to allow and prohibit an inflow and an outflow of a working fluid into and from fluid chambers of the cylinder.

As one concrete configuration, the stabilizer device may be configured as follows:

The stabilizer device according to the present disclosure,
  wherein both ends of the stabilizer bar are respectively connected to a pair of wheel holding portions that respectively hold right and left wheels and that move upward and downward with the corresponding right and left wheels relative to the body of the vehicle,
  wherein the stabilizer device includes:
    a pair of cylinders which contain a working fluid and each of which is disposed between the body of the vehicle and a corresponding one of a pair of right and left supported portions of the stabilizer bar such that the stabilizer bar is supported by the body of the vehicle at the supported portions, each of the cylinders being configured to extend and contract in accordance with a rebound motion and a bound motion of a corresponding one of the right and left wheels with respect to the body of the vehicle, each of the cylinders including a first fluid chamber whose volume increases in the rebound motion of the corresponding one of the right and left wheels and decreases in the bound motion of the corresponding one of the right and left wheels and a second fluid chamber whose volume decreases in the rebound motion of the corresponding one of the right and left wheels and increases in the bound motion of the corresponding one of the right and left wheels;

a first communication passage through which the first fluid chamber of one of the cylinders and the second fluid chamber of the other of the cylinders communicate with each other;

a second communication passage through which the second fluid chamber of the one of the cylinders and the first fluid chamber of the other of the cylinders communicate with each other;

an inter-passage communication passage through which the first communication passage and the second communication passage communicate with each other; and an open/close valve functioning as the switching mechanism and disposed in the inter-passage communication passage, the open/close valve being configured to open the inter-passage communication passage when placed in a valve open state and to close the inter-passage communication passage when placed in a valve closed state.

In the thus constructed stabilizer device, the open/close valve is a main constituent element of the switching mechanism. The controller controls the open/close valve to selectively establish an inter-passage non-communicating state in which the first communication passage and the second communication passage do not communicate with each other and an inter-passage communicating state in which the first communication passage and the second communication passage communicate with each other, whereby the roll suppressing function is switched between the effective state and the ineffective state.

As another concrete configuration, the stabilizer device may be configured as follows:

The stabilizer device according to the present disclosure, wherein both ends of the stabilizer bar are connected to one of i) the body of the vehicle and ii) a pair of wheel holding portions that respectively hold right and left wheels and that move upward and downward with the corresponding right and left wheels relative to the body of the vehicle, the stabilizer bar being supported by the other of i) the body of the vehicle and ii) the pair of wheel holding portions, wherein the stabilizer device includes:

a cylinder disposed between: the one of i) the body of the vehicle and ii) the pair of wheel holding portions; and one of the both ends of the stabilizer bar, the cylinder being configured to extend and contract in accordance with a) a rebound motion of one of the right and left wheels and a bound motion of the other of the right and left wheels and (b) a bound motion of the one of the right and left wheels and a rebound motion of the other of the right and left wheels, the cylinder including a first fluid chamber whose volume increases when the cylinder extends and decreases when the cylinder contracts and a second fluid chamber whose volume decreases when the cylinder extends and increases when the cylinder contracts;

an inter-chamber communication passage through which the first fluid chamber and the second fluid chamber communicate with each other, and at least one open/close valve functioning as the switching mechanism and disposed in the inter-chamber communication passage, each of the at least one open/close valve being configured to open the inter-chamber communication passage when placed in a valve open state and to close the inter-chamber communication passage when placed in a valve closed state.

In the thus constructed stabilizer device, the at least one open/close valve is a main constituent element of the switching mechanism. The controller controls each of the at least one open/close valve to establish an inter-chamber non-communicating state in which the first fluid chamber and the second fluid chamber do not communicate with each other and an inter-chamber communicating state in which the first fluid chamber and the second fluid chamber communicate with each other, whereby the roll suppressing function is switched between the effective state and the ineffective state.

The actual lateral acceleration utilized in the stabilizer system according to the present disclosure may be based on detection by a lateral acceleration sensor provided in the vehicle, for instance. The estimated lateral acceleration may be estimated based on an operation amount of a steering operating member such as a steering wheel, more specifically, based on the operation amount and a traveling speed of the vehicle. Alternatively, the estimated lateral acceleration may be estimated based on an actual yaw rate obtained based on detection by a yaw rate sensor provided in the vehicle.

A threshold lateral acceleration when the actual lateral acceleration is employed or selected as the determination lateral acceleration and a threshold lateral acceleration when the estimated lateral acceleration is employed or selected as the determination lateral acceleration may be the same value, namely, may be the same in magnitude. Instead, the threshold lateral acceleration when the actual lateral acceleration is employed as the determination lateral acceleration and the threshold lateral acceleration when the estimated lateral acceleration is employed as the determination lateral acceleration may be different from each other, namely, may be different in magnitude.

Here, a case is considered in which the estimated lateral acceleration that is based on the operation amount of the steering operating member is employed as the determination lateral acceleration. In turning of the vehicle, the estimated lateral acceleration rises and reduces earlier than the actual lateral acceleration, and the actual lateral acceleration rises and reduces later than the estimated lateral acceleration. That is, the actual lateral acceleration is somewhat delayed with respect to the estimated lateral acceleration. In typical turning, therefore, the actual lateral acceleration is employed as the determination lateral acceleration for rendering the roll suppressing function of the stabilizer device effective in the initial stage of turning, and the estimated lateral acceleration is employed as the determination lateral acceleration for rendering the roll suppressing function of the stabilizer device ineffective in the final stage of turning. In a case where emphasis is placed on rendering the roll suppressing function of the stabilizer device effective at early timing in turning, the threshold lateral acceleration when the actual lateral acceleration is employed as the determination lateral acceleration is preferably less than the threshold lateral acceleration when the estimated lateral acceleration is employed as the determination lateral acceleration. On the other hand, if the roll suppressing function is rendered ineffective before the actual lateral acceleration is sufficiently reduced, it is anticipated that the posture of the vehicle body abruptly changes from a state in which the vehicle body remains somewhat inclined. In view of this, the threshold lateral acceleration when the estimated lateral acceleration is employed as the determination lateral acceleration is preferably less than the threshold lateral acceleration when the actual lateral acceleration is employed as the determination lateral acceleration.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 2A is a view illustrating a structure of a held portion of a stabilizer bar of the first stabilizer device;

FIG. 2B is a view illustrating a structure of a supported portion of the stabilizer bar of the first stabilizer device;

FIG. 2C is a view illustrating a structure of a cylinder;

FIG. 2D is a view illustrating a structure of another cylinder;

FIG. 5 is a flowchart representing a stabilizer control program executed by an electronic control unit (ECU) that is a controller of the stabilizer system according to the embodiment;

DETAILED DESCRIPTION OF THE EMBODIMENT

Figure 1:
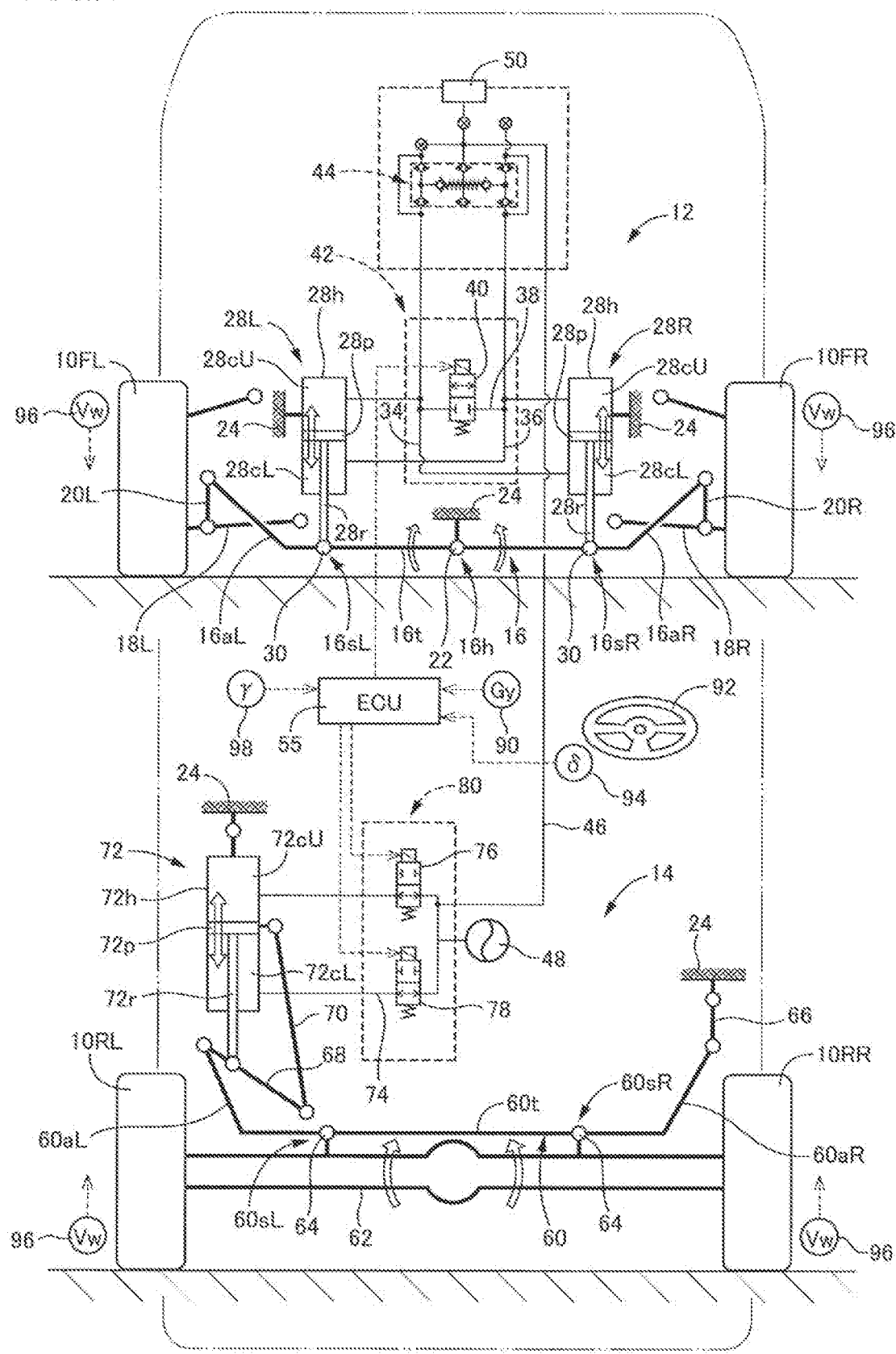
FIG. 1 is a schematic view of a stabilizer system for a vehicle according to an embodiment in which a first stabilizer device is provided for front wheels and a second stabilizer device is provided for rear wheels.

Referring to the drawings, there will be explained below in detail a stabilizer system according to one embodiment of the present disclosure. It is to be understood that the present disclosure is not limited to the details of the following embodiment but may be embodied based on the forms described in Various Forms and may be changed and modified based on the knowledge of those skilled in the art.

1. Configuration of Stabilizer System

As schematically illustrated in FIG. 1, a stabilizer system according to the embodiment includes a first stabilizer device 12 (as a stabilizer device according to the embodiment) mounted on front left and right wheels 10FL, 10FR of a vehicle and a second stabilizer device 14 (as a stabilizer device according to the embodiment) mounted on rear left and right wheels 10RL, 10RR of the vehicle. One of the front left and right wheels 10FL, 10FR, will be referred to as "front wheel 10F" where appropriate, and one of the rear left and right wheels 10RL, 10RR will be referred to as "rear wheel 10R" where appropriate. When it is not necessary to distinguish the front left and right wheels 10FL, 10FR and the rear left and right wheels 10RL, 10RR from one another, each of the wheels 10FL, 10FR, 10RL, 10RR will be referred to as "wheel 10" where appropriate. Each of the front left and right wheels 10F is a steerable wheel configured to be steered in turning of the vehicle.

(a) Configuration of First Stabilizer Device

Each of the front left and right wheels 10FL, 10FR is suspended by a double-wishbone suspension apparatus that is an independent suspension apparatus. The first stabilizer device 12 includes a stabilizer bar 16 as a main constituent element. The stabilizer bar 16 includes a middle torsion bar portion 16$t$ and left and right arm portions 16$a$L, 16$a$R. The torsion bar portion 16$t$ and the left and right arm portions 16$a$L, 16$a$R are formed in one piece. The directions in which the left and right arm portions 16$a$L, 16$a$R extend intersect the width direction of the vehicle, namely, the direction in which the torsion bar portion 16$t$ extends. Both ends of the stabilizer bar 16, namely, distal ends of the respective left and right arm portions 16$a$L, 16$a$R, are connected to respective left and right lower arms 18L, 18R via respective link rods 20L, 20R.

The lower arms 18L, 18R function as a pair of wheel holding portions each of which holds a corresponding one of the front left and right wheels 10F and each of which moves upward and downward with the corresponding front wheel 10F relative to a body of the vehicle. While not shown, a suspension spring and a shock absorber, which are supported at one ends thereof by a mount portion of the vehicle body, are connected at the other ends thereof to a corresponding one of the lower arms 18L, 18R. Regarding a pair of left and right constituent elements whose reference characters are suffixed with "L" or "R", such as the arm portions 16$a$L, 16$a$R and the lower arms 18L, 18R, when it is not necessary to distinguish between left and right, one of the pair of left and right constituent elements will be simply referred to as "arm portion 16$a$", "lower arm 18", etc., where appropriate.

As later explained in detail, the stabilizer bar 16 has a held portion 16$h$ provided in the middle of the torsion bar portion 16$t$ in the vehicle width direction. The stabilizer bar 16 is held at the held portion 16$h$ by a part 24 of the vehicle body through a holder 22. (Each of various parts of the vehicle body is hatched in the drawings and will be hereinafter referred to as "part 24".) As illustrated in FIG. 2A, the holder 22 includes a bushing 26 for the held portion 16$h$ (hereinafter simply referred to as "bushing 26" where appropriate). The bushing 26 includes an outer sleeve 26$o$ and a rubber elastic member 26$g$ interposed between the outer sleeve 26$o$ and the torsion bar portion 16$t$ of the stabilizer bar 16. The stabilizer bar 16 is allowed to swing about the held portion 16$h$ (as indicated by white arrows in FIG. 1). The bushing 26 allows the stabilizer bar 16 to rotate about the axis of the torsion bar portion 16*t*, namely, the bushing 26 allows twisting of the stabilizer bar 16.

The first stabilizer device 12 includes a pair of cylinders 28L, 28R. Each of the cylinders 28L, 28R includes a housing 28*h*, a piston 28*p* disposed in the housing 28*h*, and a piston rod 28*r* having a base end portion connected to the piston 28*p* and a distal (lower) end portion extending downward out of the housing 28*h*. The housing 28*h* of each cylinder 28L, 28R is fixedly connected to a part 24 of the vehicle body, and the distal end portion of the piston rod 28*r* of each cylinder 28L, 28R is connected, via a support 30, to a corresponding one of a pair of supported portion 16*s*L, 16*s*R that are respectively provided at left and right portions of the torsion bar portion 16*t* of the stabilizer bar 16.

As illustrated in FIG. 28, the support 30 includes a bushing 32 for the supported portion 16*s* (hereinafter simply referred to as "bushing 32" where appropriate). The bushing 32 includes an outer sleeve 32*o* and a rubber elastic member 32*g* interposed between the outer sleeve 32*o* and the torsion bar portion 16*t* of the stabilizer bar 16. Like the bushing 26 for the held portion 16*h*, the bushing 32 for the supported portion 16*s* allows the stabilizer bar 16 to rotate about the axis of the torsion bar portion 16*t*, namely, the bushing 32 allows twisting of the stabilizer bar 16.

As apparent from comparison between FIG. 2A and FIG. 2B, the rubber elastic member 26*g* of the bushing 26 has a larger thickness than the rubber elastic member 32*g* for the supported portion 16*s*. Since the rubber elastic member 32*g* and the rubber elastic member 26*g* are formed of the same material, the bushing 26 has a spring constant in the up-down direction smaller than that of the bushing 32. That is, the bushing 26 is softer than the bushing 32. Thus, the stabilizer bar 16 is firmly supported at the supported portions 16*s*L, 16*s*R and has a relatively small resistance to its own swinging motion about the held portion 16*h*.

As indicated by white arrows in FIG. 1, each of the cylinders 28L, 28R can extend and contract by an upward and downward movement of a corresponding one of the left and right supported portions 16*s*L, 16*s*R of the torsion bar portion 16*t* of the stabilizer bar 16. The housing 28*h* of each cylinder 28L, 28R is divided by the piston 28*p* into two fluid chambers, i.e., an upper chamber 28*c*U and a lower chamber 28*c*L, whose volumes vary in accordance with extension and contraction of the cylinder 28L, 28R. Specifically, each cylinder 28L, 28R includes: the upper chamber 28*c*U as a first fluid chamber whose volume increases when the cylinder 28L, 28R extends, namely, when the corresponding front wheel 10F rebounds and whose volume decreases when the cylinder 28L, 28R contracts, namely, when the corresponding front wheel 10F bounds; and the lower chamber 28*c*L as a second fluid chamber whose volume decreases when the cylinder 28L, 28R extends and whose volume increases when the cylinder 28L, 28R contracts.

The first stabilizer device 12 includes: a first communication passage 34 through which the upper chamber 28*c*U of the cylinder 28L and the lower chamber 28*c*L of the cylinder 28R communicate with each other; and a second communication passage 36 through which the lower chamber 28*c*L of the cylinder 28L and the upper chamber 28*c*U of the cylinder 28R communicate with each other. The first stabilizer device 12 further includes: an inter-passage communication passage 38 through which the first communication passage 34 and the second communication passage 36 communicate with each other; and an open/close valve 40 disposed in the inter-passage communication passage 38. The open/close valve 40 is a normally-closed electromagnetic valve configured to be placed in its valve open state when energized. The open/close valve 40 is configured to open the inter-passage communication passage 38 when placed in the valve open state and to close the inter-passage communication passage 38 when placed in its closed state. When the open/close valve 40 is placed in the valve open state, there is established an inter-passage communicating state in which the first communication passage 34 and the second communication passage 36 communicate with each other. When the open/close valve 40 is placed in the valve closed state, there is established an inter-passage non-communicating state in which the first communication passage 34 and the second communication passage 36 do not communicate with each other.

In other words, each of the first communication passage 34 and the second communication passage 36 of the first stabilizer device 12 is a cross pipe, and the first stabilizer device 12 includes two hydraulic systems in each of which the upper chamber 28*c*U of one of the two cylinders 28 and the lower chamber 28*c*L of the other of the two cylinders 28 are connected by a corresponding one of the cross pipes. For communication between the two hydraulic systems, the first stabilizer device 12 includes a switching mechanism including the inter-passage communication passage 38 and the open/close valve 40, namely, a switching mechanism 42 configured to selectively establish the inter-passage communicating state and the inter-passage non-communicating state.

While not explained in detail, the first stabilizer device 12 includes a valve mechanism 44 as a mechanism that allows an inflow and an outflow of the working fluid into and out of at least one of the two hydraulic systems, specifically, each of the first communication passage 34 and the second communication passage 36. The valve mechanism 44 allows the inflow and the outflow of the working fluid into and out of both the first communication passage 34 and the second communication passage 36 in accordance with a change in the volume of the working fluid due to a change in the temperature of the first stabilizer device 12. For permitting the function of allowing the inflow and outflow of the working fluid to work, the valve mechanism 44 is connected to an accumulator 48 of a second stabilizer device 14 (that will be explained) via an inter-device communication passage 46. The valve mechanism 44 is provided with an injection port 50 through which the working fluid is injected into the first stabilizer device 12.

The stabilizer system includes an electronic control unit (hereinafter referred to as "ECU" where appropriate) 55 functioning as a controller of the first stabilizer device 12. The ECU 55 controls operations of the open/close valve 40. While not explained in detail, the ECU 55 includes a computer including a CPU, a ROM, a RAM, etc., and a drive circuit for the open/close valve 40.

(b) Configuration of Second Stabilizer Device

The rear wheels 10RL, 10RR are suspended by a rigid axle suspension apparatus, and the second stabilizer device 14 is provided for the rear wheels 10RL, 10RR. Like the first stabilizer device 12, the second stabilizer device 14 includes a stabilizer bar 60 as a main constituent element. The stabilizer bar 60 of the second stabilizer device 14 includes a middle torsion bar portion 60*t* and left and right arm portions 60*a*L, 60*a*R. The torsion bar portion 60*t* and the left and right arm portions 60*a*L, 60*a*R are formed in one piece. The directions in which the left and right arm portions 60*a*L, 60*a*R extend intersect the vehicle width direction, namely, the direction in which the torsion bar portion 60*t* extends.

The torsion bar portion 60*t* of the stabilizer bar 60 includes left and right supported portions 60*s*L, 60*s*R. The stabilizer bar 60 is supported at the supported portions 60sL, 60sR by an axle housing 62 through respective supports 64. Both ends of the axle housing 62 function as wheel holding portions that respectively hold the rear wheels 10RL, 10RR. The axle housing 62 is capable of swinging as indicated by white arrows in FIG. 1 in accordance with an upward and downward movement of the rear wheels 10RL, 10RR relative to the vehicle body. While not illustrated, like the supports 30 of the first stabilizer device 12, each support 64 includes a bushing for the supported portion 60s that includes an outer sleeve and a rubber elastic member. The support 64 allows the stabilizer bar 60 to rotate about the axis of the torsion bar portion 60t, namely, the support 64 allows twisting of the stabilizer bar 60.

Both ends of the stabilizer bar 60, namely, distal ends of the respective left and right arm portions 60aL, 60aR, are connected to parts 24 of the vehicle body, namely, to left and right parts of the vehicle body in the vehicle width direction. Specifically, the distal end of the right arm portion 60aR is connected to the right part of the vehicle body via a link rod 66, and the distal end of the left arm portion 60aL is connected to the left part via link rods 68, 70 and a cylinder 72. Like the cylinder 28 of the first stabilizer device 12, the cylinder 72 includes a housing 72h, a piston 72p disposed in the housing 72h, and a piston rod 72r having a base end portion connected to the piston 72p and a distal (lower) end portion extending downward out of the housing 72h. The housing 72h is swingably supported by a part 24 of the vehicle body via a bushing. One end of the link rod 68 is connected to the distal end of the arm portion 60aL, the other end of the link rod 68 is connected to one end of the link rod 70, and the other end of the link rod 70 is connected to the housing 72h of the cylinder 72. The distal end of the piston rod 72r is connected to an intermediate portion of the link rod 68, whereby the distal end of the piston rod 72r is connected to the distal end of the left arm portion 60aL of the stabilizer bar 60, namely, to one end of the stabilizer bar 60.

As indicated by white arrows in FIG. 1, the cylinder 72 can extend and contract in accordance with the swinging motion of the axle housing 62. Like the housing 28h of the cylinder 28 of the first stabilizer device 12, the housing 70h is divided by the piston 72p into two fluid chambers, i.e., an upper chamber 72cU and a lower chamber 72cL, whose volumes vary in accordance with extension and contraction of the cylinder 72. Specifically, the cylinder 72 includes: the upper chamber 72cU as a first fluid chamber whose volume increases when the cylinder 72 extends and whose volume decreases when the cylinder 72 contracts; and the lower chamber 72cL as a second fluid chamber whose volume decreases when the cylinder extends and whose volume increases when the cylinder 72 contracts.

The second stabilizer device 14 includes an inter-chamber communication passage 74 through which the upper chamber 72cU and the lower chamber 72cL of the cylinder 72 communicate with each other. In the inter-chamber communication passage 74, a first open/close valve 76 and a second open/close valve 78 are disposed in series. Each of the first open/close valve 76 and the second open/close valve 78 is a normally-opened electromagnetic valve configured to be placed in its valve closed state when energized. Each valve 76, 78 is configured to open the inter-chamber communication passage 74 when placed in the valve open state and to close the inter-chamber communication passage 74 when placed in the valve closed state. Specifically, when both the first open/close valve 76 and the second open/close valve 78 are placed in the valve open state, there is established an inter-chamber communicating state in which the upper chamber 72cU and the lower chamber 72cL communicate with each other. When both the first open/close valve 76 and the second open/close valve 78 are placed in the valve closed state, there is established an inter-chamber non-communicating state in which the upper chamber 72cU and the lower chamber 72cL do not communicate with each other. In other words, the second stabilizer device 14 includes a switching mechanism including the first open/close valve 76 and the second open/close valve 78, namely, a switching mechanism 80 configured to selectively establish the inter-chamber communicating state and the inter-chamber non-communicating state.

As later explained in detail, the cylinder 72 is what is called one-side rod cylinder. The overall volume of the housing 72h, namely, the total volume of the upper chamber 72cU and the lower chamber 72cL, changes in accordance with extension and contraction of the cylinder 72. In other words, there is a difference between an amount of the working fluid that flows into and out of the upper chamber 72cU when the cylinder 72 extends and contracts and an amount of the working fluid that flows into and out of the lower chamber 72cL when the cylinder 72 extends and contracts. For compensating for this difference, namely, the volume change, the accumulator 48 of the second stabilizer device 14 is connected to the inter-chamber communication passage 74 at a position between the first open/close valve 76 and the second open/close valve 78. The accumulator 48 functions as both an accumulator required for the first stabilizer device 12 and an accumulator required for the second stabilizer device 14, and is used in common by the first stabilizer device 12 and the second stabilizer device 14. Thus, the number of accumulators is reduced in the stabilizer system of the present embodiment. In the stabilizer system, it may be considered that the hydraulic systems of the first stabilizer device 12 and the hydraulic system of the second stabilizer device 14 are connected by the inter-device communication passage 46.

The working fluid is injected into the second stabilizer device 14 through the injection port 50 of the first stabilizer device 12 via the inter-device communication passage 46. That is, the injection port 50 is a single injection port used in common by the first stabilizer device 12 and the second stabilizer device 14. In the stabilizer system, the working fluid can be easily injected utilizing the injection port 50. In this respect, it may be considered that the injection port 50 is utilized for injecting the working fluid into both the accumulator 48 and the valve mechanism 44. The ECU 55 explained above includes drive circuits for the first open/close valve 76 and the second open/close valve 78 and functions also as a controller of the second stabilizer device 14 to control the first open/close valve 76 and the second open/close valve 78.

In the second stabilizer device 14, the torsion bar portion 60t of the stabilizer bar 60 is supported by the axle housing 62, and the distal ends of the arm portions 60aL, 60aR are connected to the parts 24 of the vehicle body. In place of the thus constructed stabilizer device, the present stabilizer system may employ a stabilizer device in which the torsion bar portion of the stabilizer bar 60 is supported by the vehicle body, and the distal ends of the arm portions are respectively connected to both ends of the axle housing.

2. Operation of Stabilizer System

There will be hereinafter explained an operation of the present stabilizer system referring to operations of the first stabilizer device 12 and the second stabilizer device 14.

(a) Operation of First Stabilizer Device

As explained above, when the open/close valve 40 of the switching mechanism 42 of the first stabilizer device 12 is in the valve closed state, the inter-passage non-communicating state is established in which the first communication passage 34 and the second communication passage 36 do not communicate with each other. As illustrated in FIG. 2C, although the piston rod 28r of the cylinder 28 extends through the lower chamber 28cL, it does not extend through the upper chamber 28cU. Thus, the amount of change in the volume of the upper chamber 28cU caused when the cylinder 28 extends and contracts differs from the amount of change in the volume of the lower chamber 28cL caused when the cylinder 28 extends and contracts. Accordingly, in the inter-passage non-communicating state in which the first communication passage 34 and the second communication passage 36 do not communicate with each other, the working fluid does not flow between the upper chamber 28cU of the cylinder 28L and the lower chamber 28cl, of the cylinder 28R through the first communication passage 34, and the working fluid does not flow between the upper chamber 28cU of the cylinder 28R and the lower chamber 28cL of the cylinder 28L through the second communication passage 36. That is, both the cylinders 28L, 28R are prohibited from being extended and contracted.

Figure 3A:
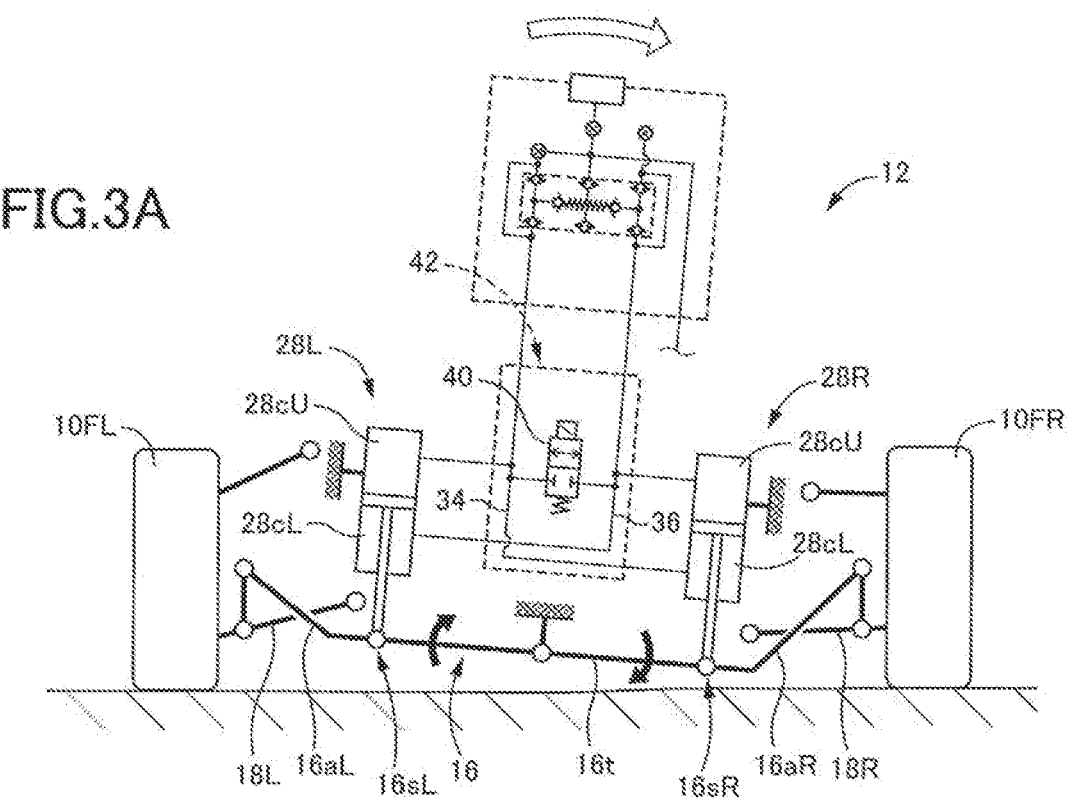
FIG. 3A is a schematic view for explaining an operation of the first stabilizer device in turning of the vehicle.

As illustrated in FIG. 3A, when the vehicle turns, the vehicle body is inclined or tilted in the right-left direction, in other words, the vehicle body rolls. FIG. 3A illustrates a state in which the vehicle turns to the left and the vehicle body is inclined to the right. When the cylinders 28L, 28R are prohibited from extending and contracting, the supported portions 16sL, 16sR of the torsion bar portion 16t of the stabilizer bar 16, which are respectively supported by the distal ends of the piston rods 28r of the cylinders 28L, 28R, are prohibited from moving upward and downward relative to the vehicle body, so that the torsion bar portion 16t is twisted. A reaction force of the twisting acts on the lower arms 18L, 18R via the left and right arm portions 16aL, 16aR, thus suppressing roll of the vehicle body.

Figure 3B:
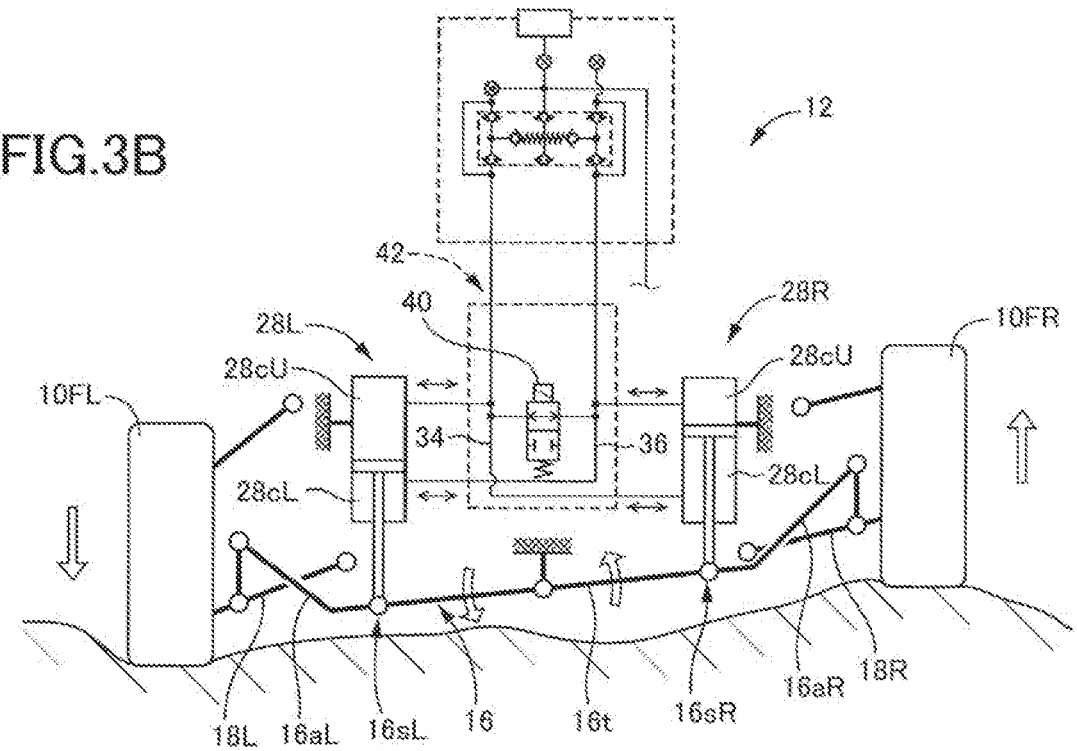
FIG. 3B is a schematic view for explaining an operation of the first stabilizer device in off-road traveling of the vehicle.

As illustrated in FIG. 3B, when the open/close valve 40 is in the valve open state, the inter-passage communicating state is established in which the first communication passage 34 and the second communication passage 36 communicate with each other, and the working fluid is allowed to flow into and out of the upper chambers 28cU and the lower chambers 28cL of the cylinders 28L, 28R. As a result, when one of the cylinders 28L, 28R extends by a certain amount, the other of the cylinders 28L, 28R is allowed to contract by the same amount, and when the one of the cylinders 28L, 28R contracts by a certain amount, the other of the cylinders 28L, 28R is allowed to extend by the same amount.

Assume that external inputs are applied to the front left and right wheels 10FL, 10FR in a state in which the cylinders 28L, 28R are allowed to extend and contract as described above, as illustrated in FIG. 3B. FIG. 3B illustrates a case in which the vehicle is traveling off-road (on rough terrain) and external inputs that cause the front left wheel 10FL to rebound and cause the front right wheel 10FR to bound are applied to the front left and right wheels 10FL, 10FR. In this case, the supported portions 16sL, 16sR of the stabilizer bar 16 are allowed to move upward and downward relative to the vehicle body, so that the stabilizer bar 16 swings about the held portion 16h in accordance with an upward and downward movement of the front left and right wheels 10FL, 10FR (strictly, a relative upward and downward movement). Specifically, when each of the front left and right wheels 10FL, 10FR rebounds or bounds, a corresponding one of the cylinders 28L, 28R extends or contracts, so that the stabilizer bar 16 is allowed to swing. Owing to the upward and downward movement of the supported portions 16sL, 16sR involving the swinging motion of the stabilizer bar 16, the stabilizer bar 16 is hardly twisted. That is, the stabilizer bar 16 does not exert a force on the lower arms 18L, 18R. Accordingly, the inputs from the road surface to the front left and right wheels 10FL, 10FR can be effectively absorbed even when the vehicle is traveling on rough terrain.

Each cylinder 28 of the first stabilizer device 12 is what is called one-side rod cylinder as illustrated in FIG. 2C, namely, a cylinder including the piston rod 28r that extends out of the housing 28h through the lower chamber 28cL that is one of the two fluid chambers. Accordingly, a pressure receiving area SU of the piston 28p on which the pressure of the working fluid in the upper chamber 28cU acts is larger than a pressure receiving area SL of the piston 28p on which the pressure of the working fluid in the lower chamber 28cL acts. Thus, even when the pressure of the working fluid in the upper chamber 28cU and the pressure of the working fluid in the lower chamber 28cL are equal to each other, the piston 28p receives a downward force, and the cylinder 28 accordingly extends. Such extension of the cylinder 28 due to the downward force may cause what is called cavitation phenomenon, which is unfavorable especially in the inter-passage communicating state. In the first stabilizer device 12, the stabilizer bar 16 is held at the held portions 16h by the holder 22, thus effectively preventing the extension of the cylinder 28 due to the downward force described above. For preventing the cavitation phenomenon, the first stabilizer device 12 is configured such that one of the hydraulic system constituted by the first communication passage 34 and the hydraulic system constituted by the second communication passage 36, which one has a lower pressure, is brought into communication with the accumulator 48 via the valve mechanism 44.

The cylinder 28 may be replaced with a cylinder 28' illustrated in FIG. 2D, namely, a both-side rod cylinder. In the cylinder 28', the pressure receiving area SL is equal to the pressure receiving area SU. Thus, the cylinder 28' does not extend as described above. The cylinder 28', however, has disadvantages that it has a relatively complicated structure for sealing of the working fluid and it requires a longer installation space.

(b) Operation of Second Stabilizer Device

As explained above, when both the first open/close valve 76 and the second open/close valve 78 of the switching mechanism 80 of the second stabilizer device 14 are in the valve closed state, the inter-chamber non-communicating state is established in which the upper chamber 72cU and the lower chamber 72cL of the cylinder 72 do not communicate with each other. In the inter-chamber non-communicating state, the working fluid is prohibited from flowing into and out of the upper chamber 72cU and the lower chamber 72cL to thereby prohibit the cylinder 72 from extending and contracting.

Figure 4A:
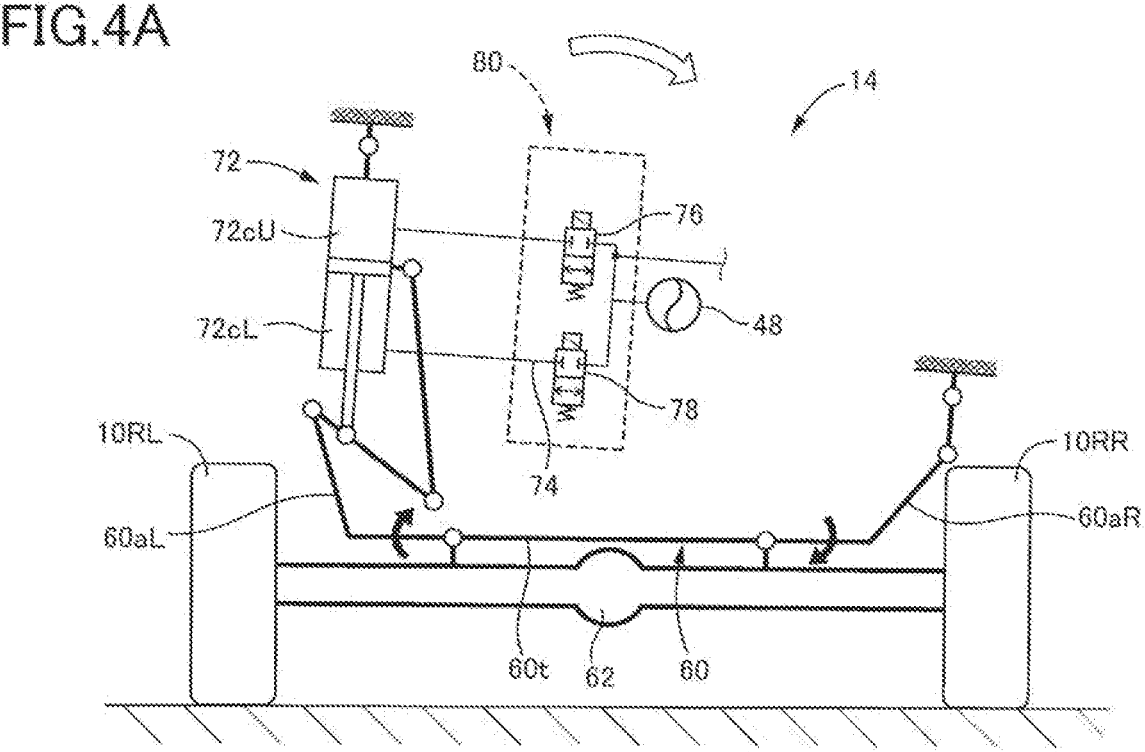
FIG. 4A is a schematic view for explaining an operation of the second stabilizer device in turning of the vehicle.

As illustrated in FIG. 4A, when the vehicle turns, the vehicle body is inclined or tilted in the right-left direction, in other words, the vehicle body rolls. FIG. 4A illustrates a state in which the vehicle turns to the left and the vehicle body is inclined to the right. When the vehicle body is inclined, the axle housing 62 that supports the torsion bar portion 60t of the stabilizer bar 60 at the supported portions 60sL, 60sR swings relative to the vehicle body. In a state in which the cylinder 72 is prohibited from extending and contracting, the positions, in the up-down direction, of the distal ends of the arms 60aL, 60aR of the stabilizer bar 60 relative to the vehicle body do not substantially change. Accordingly, the swinging of the axle housing 62 relative to the vehicle body causes the torsion bar portion 60t of the stabilizer bar 60 to be twisted. A reaction force of the twisting acts on the parts 24 of the vehicle body through the left and right arm portions 60aL, 60aR and the cylinder 72, so that roll of the vehicle body is suppressed.

As illustrated in FIG. 41, when the first open/close valve 76 and the second open/close valve 78 are both in the valve open state, the inter-chamber communicating state is established in which the upper chamber 72cU and the lower chamber 72cL of the cylinder 72 communicate with each other, thus allowing the working fluid to substantially freely flow into and out of the upper chamber 72cU and the lower chamber 72cL. The cylinder 72 is allowed to extend and contract without any substantial restriction.

Figure 4B:
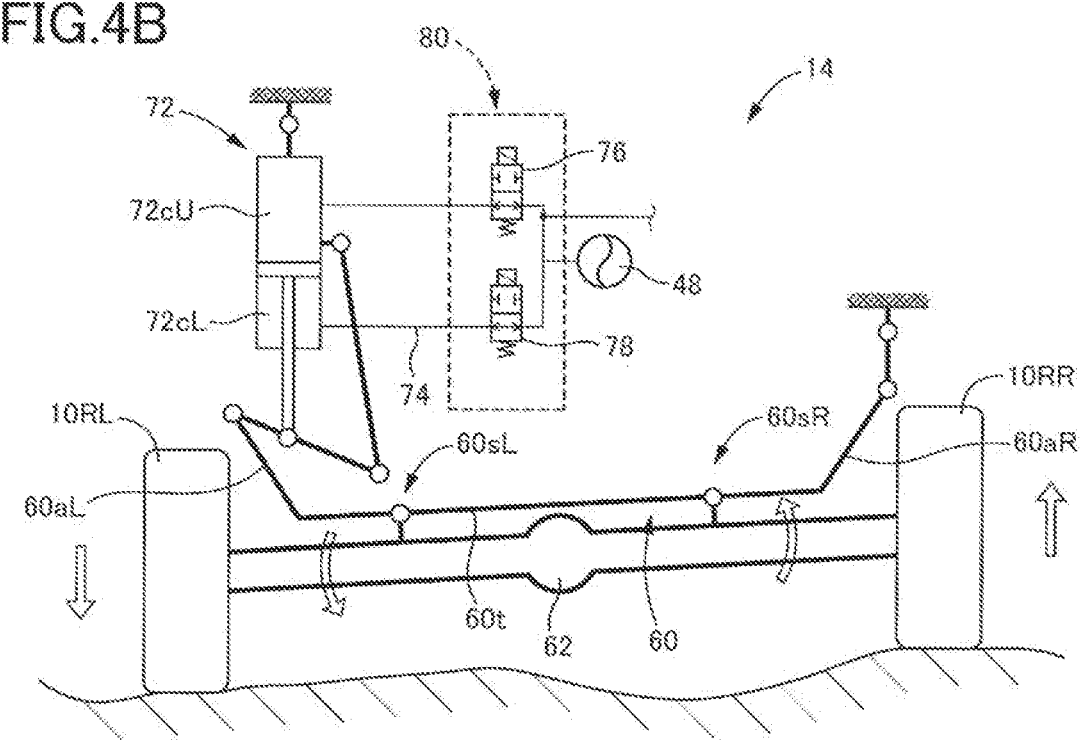
FIG. 4B is a schematic view for explaining an operation of the second stabilizer device in off-road traveling of the vehicle.

Assume that external inputs are applied to the rear left and right wheels 10RL, 10RR in a state in which the cylinder 72 is allowed to extend and contract, as illustrated in FIG. 4B. FIG. 4B illustrates a case in which the vehicle is traveling off-road and the external inputs to cause the rear left wheel 10RL to rebound and cause the rear right wheel 10RR to bound are applied to the rear left and right wheels 10RL, 10RR. In this case, the axle housing 62 swings, so that the stabilizer bar 60 supported at the supported portions 60sL, 60sR by the axle housing 62 also swings. Since the cylinder 72 is allowed to extend and contract, the torsion bar portion 60t of the stabilizer bar 60 is hardly twisted by the swinging of the stabilizer bar 60. That is, the stabilizer bar 60 does not exert a force on the swinging of the axle housing 62 relative to the vehicle body. Accordingly, the inputs from the road surface to the rear left and right wheels 10RL, 10RR can be effectively absorbed even when the vehicle is traveling on rough terrain.

Also in the second stabilizer device 14, the cylinder 72 may be replaced with the cylinder 28' illustrated in FIG. 2D, namely, the both-side rod cylinder. The use of the both-side rod cylinder attains the stabilizer device that does not require the accumulator 48. In such a stabilizer apparatus, the two open/close valves, i.e., the first open/close valve 76 and the second open/close valve 78, are not required, and a single open/close valve can switch the inter-chamber communicating state and the inter-chamber non-communicating state.

(c) Roll Suppressing Function by Stabilizer Device and Roll Stiffness

As explained above, the roll suppressing function of the first stabilizer device 12 is rendered effective when the inter-passage non-communicating state is established, and the roll suppressing function of the second stabilizer device 14 is rendered effective when the inter-chamber non-communicating state is established. In the first stabilizer device 12, the switching mechanism 42 for selectively establishing the inter-passage communicating state and the inter-passage non-communicating state is considered as a mechanism for switching the roll suppressing function by the stabilizer bar 16 between an effective state in which the roll suppressing function is rendered effective and an ineffective state in which the roll suppressing function is rendered ineffective. In the second stabilizer device 14, the switching mechanism 80 for selectively establishing the inter-chamber communicating state and the inter-chamber non-communicating state is considered as a mechanism for switching the roll suppressing function by the stabilizer bar 60 between an effective state in which the roll suppressing function is rendered effective and an ineffective state in which the roll suppressing function is rendered ineffective.

There will be explained a degree to which the roll suppressing effects are exhibited. The first stabilizer device 12 and the second stabilizer device 14 are configured such that roll stiffness on the front wheel side (10F) is higher than roll stiffness on the rear wheel side (10R) in a case where the roll suppressing effects of both the first stabilizer device 12 and the second stabilizer device 14 are exhibited. With this configuration, the vehicle has an understeer tendency and accordingly presents a stable turning behavior.

3. Control of Stabilizer System
(a) Overview of Control

The stabilizer system is configured to switch the inter-passage communicating state and the inter-passage non-communicating state in the first stabilizer device 12 and to switch the inter-chamber communicating state and the inter-chamber non-communicating state in the second stabilizer device 14, based on a magnitude of a lateral acceleration Gy of the vehicle. Specifically, it is determined whether the lateral acceleration Gy is greater than a threshold lateral acceleration $Gy_{TH}$. When the lateral acceleration Gy exceeds the threshold lateral acceleration Gy, the open/close valve 40 is placed in the valve closed state to establish the inter-passage non-communicating state in the first stabilizer device 12, and the first open/close valve 76 and the second open/close valve 78 are placed in the valve closed state to establish the inter-chamber non-communicating state in the second stabilizer device 14. Thus, the roll suppressing functions of both the first stabilizer device 12 and the second stabilizer device 14 are rendered effective. On the other hand, when the lateral acceleration Gy is not greater than the threshold lateral acceleration $Gy_{TH}$, the open/close valve 40 is placed in the valve open state to establish the inter-passage communicating state in the first stabilizer device 12, and the first open/close valve 76 and the second open/close valve 78 are placed in the valve open state to establish the inter-chamber communicating state in the second stabilizer device 14. Thus, the roll suppressing functions of both the first stabilizer device 12 and the second stabilizer device 14 are rendered ineffective.

In a case where the vehicle is traveling on an undulating road, the vehicle body suffers from roll even though the vehicle is not turning. The present stabilizer system mainly aims at suppressing roll generated when the vehicle turns. In a case where the vehicle is traveling on the undulating road and the vehicle body rolls, it is desirable not to render the roll suppressing functions of both the first stabilizer device 12 and the second stabilizer device 14 effective, in other words, the roll suppressing effects (the anti-roll effects) by both the first stabilizer device 12 and the second stabilizer device 14 are desired not to be exhibited. The vehicle is equipped with a lateral acceleration sensor 90 (FIG. 1) for detecting the lateral acceleration Gy of the vehicle body. A case is considered in which the lateral acceleration Gy detected by the lateral acceleration sensor 90 (hereinafter referred to as "actual lateral acceleration $Gy_{SEN}$" where appropriate) is employed as a lateral acceleration used for switching the roll suppressing functions between the effective state and the ineffective state, namely, as a determination lateral acceleration that is a lateral acceleration used in determining whether the lateral acceleration is greater than the threshold lateral acceleration Gy. In this case, not only when the vehicle body rolls due to turning but also when the vehicle body rolls due to traveling on the undulating road, the determination lateral acceleration (the actual lateral acceleration $Gy_{SEN}$) exceeds the threshold lateral acceleration $Gy_{TH}$. As a result, the roll suppressing functions of both the first stabilizer device 12 and the second stabilizer device 14 are rendered effective undesirably in traveling on the undulating road, thus adversely influencing the riding comfort of the vehicle.

For not rendering the roll suppressing functions effective with respect to roll of the vehicle body due to traveling on the undulating road, it is considered to employ, as the determination lateral acceleration, an estimated lateral acceleration $Gy_{EST}$ in place of the actual lateral acceleration $Gy_{SEN}$. The estimated lateral acceleration $Gy_{EST}$ is the lateral acceleration Gy estimated based on a degree of turning of the vehicle. The employment of the estimated lateral acceleration $Gy_{EST}$ as the determination lateral acceleration renders the roll suppressing functions of both the first stabilizer device 12 and the second stabilizer device 14 ineffective when the vehicle is traveling straight on the undulating road.

The vehicle is equipped with an operation angle sensor 94 for detecting, as a degree of a steering operation, an operation angle δ of a steering wheel 92 that is a steering operating member. Further, a wheel speed sensor 96 is provided for each wheel 10 to detect a rotation speed $v_W$ for the corresponding wheel 10, (The rotation speed $v_W$ will be hereinafter referred to as "wheel rotation speed $v_W$" where appropriate.) The estimated lateral acceleration $Gy_{EST}$ may be determined, for example, according to the following expression (1) based on: an operation speed dδ of the steering wheel 92 (as one sort of the degree of the steering operation) identified based on the operation angle δ detected by the operation angle sensor 94; and a vehicle speed v identified based on the wheel rotation speeds $v_W$ detected by the respective wheel speed sensors 96.

$$Gy_{EST} = \frac{d\delta \times v^2}{R_{SG} \times L \times (1 + A \times v^2)} \quad (1)$$

In the expression (1), "$R_{SG}$", "L", and "A" are a steering gear ratio, a wheelbase, and a stability factor, respectively.

The vehicle is equipped with a yaw rate sensor 98 for detecting a yaw rate γ of the vehicle. The estimated lateral acceleration $Gy_{EST}$ may also be determined, for example, according to the following expression (2) based on: an actual yaw rate γ detected by the yaw rate sensor 98; and the vehicle speed v.

$$Gy_{EST} = v \times \gamma \quad (2)$$

It is anticipated that the estimated lateral acceleration $Gy_{EST}$ will be considerably greater than the actual lateral acceleration $Gy_{SEN}$ when the driver performs an excessive steering operation (including a counter steer) or when the wheels 10 slip on a low μ road with a low road surface μ such as a dirt road or a muddy road. In a case where the estimated lateral acceleration $Gy_{EST}$ is employed as the determination lateral acceleration, the roll suppressing functions are undesirably rendered effective in a situation in which the roll suppressing functions are not desired to be effective such as during traveling on the low μ road. Consequently, the stability and the riding comfort of the vehicle may be adversely influenced.

The stabilizer system of the present embodiment therefore employs, as the determination lateral acceleration, a smaller one of the actual lateral acceleration and the estimated lateral acceleration and determines whether the determination lateral acceleration is greater than the threshold lateral acceleration $Gy_{TH}$, so as to switch the roll suppressing functions of both the first stabilizer device 12 and the second stabilizer device 14 between the effective state and the ineffective state. Owing to such switching of the roll suppressing functions, the stabilizer system of the present embodiment does not adversely influence the stability and the riding comfort of the vehicle.

(b) Control Flow

The computer of the ECU 55 repeatedly executes a stabilizer control program represented by a flowchart of FIG. 5 at a short time pitch, e.g., from several to several tens of milliseconds (msec), whereby the control of the stabilizer system, namely, the control relating to the switching of the roll suppressing functions, is executed. The process according to the program will be briefly explained referring to the flowchart.

In the process according to the stabilizer control program, at Step 1, the actual lateral acceleration $Gy_{SEN}$ is detected by the lateral acceleration sensor 90. (Hereinafter, Step 1 is abbreviated as "S1". Other steps are similarly abbreviated.) At S2, the vehicle speed v of the vehicle is identified based on the wheel speeds $v_W$ detected by the wheel speed sensors 96. At S3, the steering operation speed dδ is identified based on the operation angle δ of the steering wheel 92 detected by the operation angle sensor 94 or the yaw rate y is detected by the yaw rate sensor 98.

At S4, the estimated lateral acceleration $Gy_{EST}$ is determined according to the expression (1) or (2) based on: the identified vehicle speed v; and the identified steering operation speed dδ or the detected yaw rate γ. At S5, it is determined which one of the detected actual lateral acceleration $Gy_{SEN}$; and the determined estimated lateral acceleration $Gy_{EST}$ is larger than the other.

When the actual lateral acceleration $Gy_{SEN}$ is smaller than the estimated lateral acceleration $Gy_{EST}$, it is determined at S6 whether the actual lateral acceleration $Gy_{SEN}$ is greater than a first threshold lateral acceleration $Gy_{TH1}$ that is the threshold lateral acceleration $Gy_{TH}$. When the actual lateral acceleration $Gy_{SEN}$ is greater than the first threshold lateral acceleration $Gy_{TH1}$, the control flow proceeds to S7 at which the open/close valve 40, the first open/close valve 76, and the second open/close valve 78 are placed in the valve closed state, thus enabling the first stabilizer device 12 and the second stabilizer device 14. In other words, the roll suppressing functions of the first stabilizer device 12 and the second stabilizer device 14 are rendered effective. On the other hand, when the actual lateral acceleration $Gy_{SEN}$ is not greater than the first threshold lateral acceleration $Gy_{TH1}$, the control flow proceeds to S8 at which the open/close valve 40, the first open/close valve 76, and the second open/close valve 78 are opened, thus disabling both the first stabilizer device 12 and the second stabilizer device 14. In other words, the roll suppressing functions of both the first stabilizer device 12 and the second stabilizer device 14 are rendered ineffective.

When the actual lateral acceleration $Gy_{SEN}$ is not less than the estimated lateral acceleration $Gy_{EST}$, it is determined at S9 whether the estimated lateral acceleration $Gy_{EST}$ is greater than a second threshold lateral acceleration $Gy_{TH2}$ that is the threshold lateral acceleration $Gy_{TH}$. When the estimated lateral acceleration $Gy_{EST}$ is greater than the second threshold lateral acceleration $Gy_{TH2}$, the control flow proceeds to S7 at which the open/close valve 40, the first open/close valve 76, and the second open/close valve 78 are placed in the valve closed state, thus enabling the first stabilizer device 12 and the second stabilizer device 14. In other words, the roll suppressing functions of the first stabilizer device 12 and the second stabilizer device 14 are rendered effective. When the estimated lateral acceleration $Gy_{ES}$ is not greater than the second threshold lateral acceleration $Gy_{TH2}$, on the other hand, the control flow proceeds to S8 at which the open/close valve 40, the first open/close valve 76, and the second open/close valve 78 are placed in the valve open state, thus disabling the first stabilizer device 12 and the second stabilizer device 14. In other words, the roll suppressing functions of the first stabilizer device 12 and the second stabilizer device 14 are rendered ineffective.

(c) Threshold Lateral Acceleration

Figure 6A:
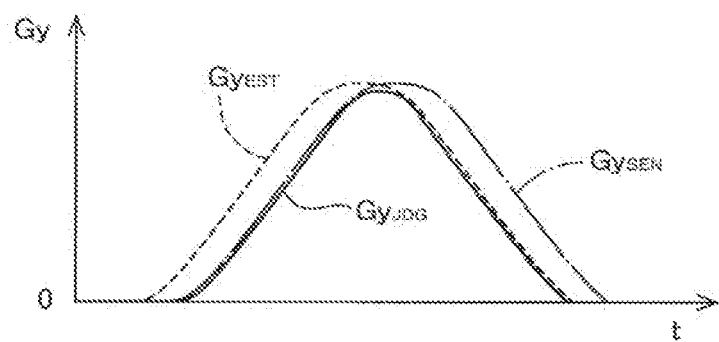
FIG. 6A is a graph for explaining changes in an actual lateral acceleration and an estimated lateral acceleration with a lapse of time in turning of the vehicle on which the stabilizer system of the embodiment is installed.

Here, a case is considered in which the vehicle is steered while running on a flat road surface with a relatively high road surface μ, namely, a case in which the vehicle normally turns. As is often the case when the estimated lateral acceleration $Gy_{EST}$ is determined based on the steering operation angle δ, a change in the actual lateral acceleration $Gy_{SEN}$ with a time t (indicated by the long dashed short dashed line in FIG. 6A) is delayed with respect to a change in the estimated lateral acceleration $Gy_{EST}$ with a lapse of time t (as indicated by the dashed line in FIG. 6A). That is, the actual lateral acceleration $Gy_{SEN}$ undergoes a delay in phase.

Here, the determination lateral acceleration described above is referred to as a determination lateral acceleration $Gy_{JDG}$. The determination lateral acceleration $Gy_{JDG}$ is determined to be a smaller one of the actual lateral acceleration $Gy_{SEN}$ and the estimated lateral acceleration $Gy_{EST}$. As indicated by the solid line in FIG. 6A, the determination lateral acceleration $Gy_{JDG}$ is equal to the actual lateral acceleration $Gy_{SEN}$ in the initial stage of turning and is equal to the estimated lateral acceleration $Gy_{EST}$ in the final stage of turning. According to the process of the stabilizer control program, the threshold lateral acceleration $Gy_{TH}$ when the actual lateral acceleration $Gy_{SEN}$ is employed as the determination lateral acceleration $Gy_{JDG}$ is the first threshold lateral acceleration $Gy_{TH1}$, and the threshold lateral acceleration $Gy_{TH}$ when the estimated lateral acceleration $Gy_{EST}$ is employed as the determination lateral acceleration $Gy_{JDG}$ is the second threshold lateral acceleration $Gy_{TH2}$. In normal turning of the vehicle, switching of the roll suppressing functions from the ineffective state to the effective state is carried out when the actual lateral acceleration $Gy_{SEN}$ exceeds the first threshold lateral acceleration $Gy_{TH}$, and switching of the roll suppressing functions from the effective state to the ineffective state is carried out when the estimated lateral acceleration $Gy_{EST}$ becomes less than the second threshold lateral acceleration $Gy_{TH2}$.

Figure 6B:
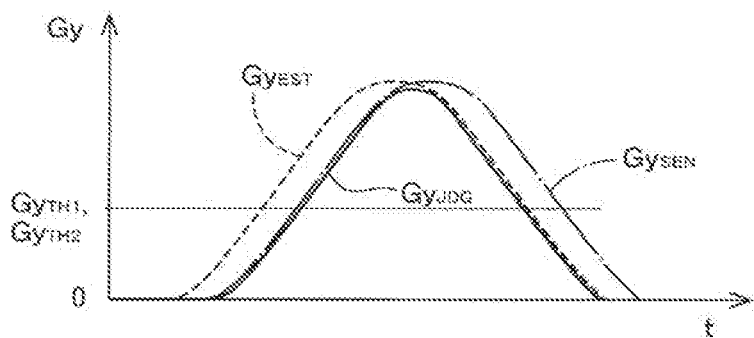
FIG. 6B is a graph for explaining a threshold lateral acceleration for switching a roll suppressing function of the stabilizer bar between an effective state and an ineffective state, FIG. 6B illustrating a first threshold lateral acceleration and a second threshold lateral acceleration, each as the threshold lateral acceleration, being the same.
Figure 6C:
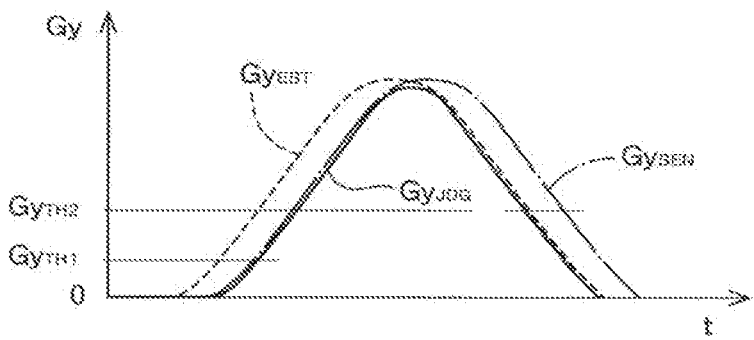
FIG. 6C is a graph for explaining the threshold lateral acceleration for switching the roll suppressing function of the stabilizer bar between the effective state and the ineffective state, FIG. 6C illustrating the first threshold lateral acceleration being less than the second threshold lateral acceleration.

In the process of the stabilizer control program, the first threshold lateral acceleration $Gy_{TH1}$ and the second threshold lateral acceleration $Gy_{TH2}$ may be the same value as illustrated in FIG. 6B. With this configuration, the overall process can be made relatively simple In contrast, the first threshold lateral acceleration $Gy_{TH1}$ may be made less than the second threshold lateral acceleration $Gy_{TH2}$, as illustrated in FIG. 6C. This configuration enables the roll suppressing functions of the first stabilizer device 12 and the second stabilizer device 14 to render effective at a relatively early timing in turning of the vehicle.

Figure 6D:
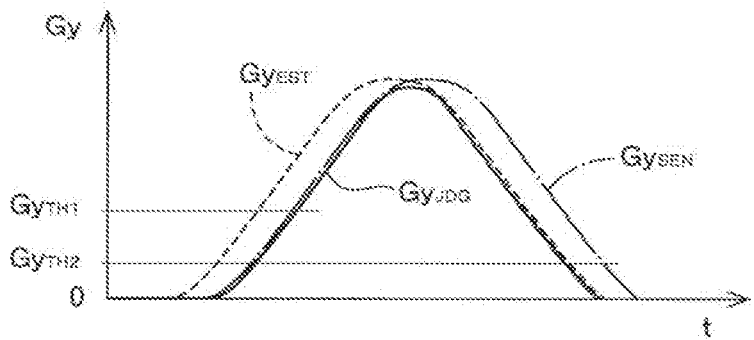
FIG. 6D is a graph for explaining the threshold lateral acceleration for switching the roll suppressing function of the stabilizer bar between the effective state and the ineffective state, FIG. 6D illustrating the second threshold lateral acceleration being less than the first threshold lateral acceleration.

Further, the second threshold lateral acceleration $Gy_{TH2}$ may be made less than the first threshold lateral acceleration $Gy_{TH1}$, as illustrated in FIG. 6D. This configuration reduces a disadvantage resulting from rendering the roll suppressing functions ineffective before the actual lateral acceleration $Gy_{SEN}$ becomes sufficiently small. That is, this configuration prevents a phenomenon in which the posture of the vehicle body abruptly changes from a state in which the vehicle body remains somewhat inclined.

What is claimed is:

1. A stabilizer system for a vehicle, comprising:
a stabilizer device including a stabilizer bar and a switch configured to switch a roll suppressing function of suppressing roll of a body of the vehicle by the stabilizer bar between an effective state in which the roll suppressing function is rendered effective and an ineffective state in which the roll suppressing function is rendered ineffective; and
a controller configured to determine whether a lateral acceleration of the body of the vehicle is greater than a threshold lateral acceleration and to control the switch to render the roll suppressing function effective when the lateral acceleration is greater than the threshold lateral acceleration and to render the roll suppressing function ineffective when the lateral acceleration is not greater than the threshold lateral acceleration,
wherein the controller selectively employs, as a determination lateral acceleration for determining whether the lateral acceleration is greater than the threshold lateral acceleration, a smaller one of an actual lateral acceleration obtained based on detection by a lateral acceleration sensor provided in the vehicle and an estimated lateral acceleration estimated based on a degree of turning of the vehicle without depending on the actual lateral acceleration.

2. The stabilizer system according to claim 1, wherein the controller employs, as the determination lateral acceleration, a smaller one of the actual lateral acceleration and the estimated lateral acceleration estimated based on a degree of an operation of a steering operating member of the vehicle.

3. The stabilizer system according to claim 1, wherein the controller employs, as the determination lateral acceleration, a smaller one of the actual lateral acceleration and the estimated lateral acceleration estimated based on an actual yaw rate obtained based on detection by a yaw rate sensor provided in the vehicle.

4. The stabilizer system according to claim 1, wherein the threshold lateral acceleration is different between when the actual lateral acceleration is employed as the determination lateral acceleration and when the estimated lateral acceleration is employed as the determination lateral acceleration.

5. The stabilizer system according to claim 4, wherein the threshold lateral acceleration when the actual lateral acceleration is employed as the determination lateral acceleration is less than the threshold lateral acceleration when the estimated lateral acceleration is employed as the determination lateral acceleration.

6. The stabilizer system according to claim 4, wherein the threshold lateral acceleration when the estimated lateral acceleration is employed as the determination lateral acceleration is less than the threshold lateral acceleration when the actual lateral acceleration is employed as the determination lateral acceleration.

7. The stabilizer system according to claim 1,
wherein both ends of the stabilizer bar are respectively connected to a pair of wheel holding portions that respectively hold right and left wheels and that move upward and downward with the corresponding right and left wheels relative to the body of the vehicle,
wherein the stabilizer device includes:
a pair of cylinders which contain a working fluid and each of which is disposed between the body of the vehicle and a corresponding one of a pair of right and left supported portions of the stabilizer bar such that the stabilizer bar is supported by the body of the vehicle at the supported portions, each of the cylinders being configured to extend and contract in accordance with a rebound motion and a bound motion of a corresponding one of the right and left wheels with respect to the body of the vehicle, each of the cylinders including a first fluid chamber whose volume increases in the rebound motion of the corresponding one of the right and left wheels and decreases in the bound motion of the corresponding one of the right and left wheels and a second fluid chamber whose volume decreases in the rebound motion of the corresponding one of the right and left wheels and increases in the bound motion of the corresponding one of the right and left wheels;

a first communication passage through which the first fluid chamber of one of the cylinders and the second fluid chamber of the other of the cylinders communicate with each other;

a second communication passage through which the second fluid chamber of the one of the cylinders and the first fluid chamber of the other of the cylinders communicate with each other;

an inter-passage communication passage through which the first communication passage and the second communication passage communicate with each other; and an open/close valve functioning as the switch and disposed in the inter-passage communication passage, the open/close valve being configured to open the inter-passage communication passage when placed in a valve open state and to close the inter-passage communication passage when placed in a valve closed state, wherein the controller controls the open/close valve to selectively establish an inter-passage non-communicating state in which the first communication passage and the second communication passage do not communicate with each other and an inter-passage communicating state in which the first communication passage and the second communication passage communicate with each other, so as to switch the roll suppressing function between the effective state and the ineffective state.

8. The stabilizer system according to claim 1,
wherein both ends of the stabilizer bar are connected to one of i) the body of the vehicle and ii) a pair of wheel holding portions that respectively hold right and left wheels and that move upward and downward with the corresponding right and left wheels relative to the body of the vehicle, the stabilizer bar being supported by the other of i) the body of the vehicle and ii) the pair of wheel holding portions, wherein the stabilizer device includes:
a cylinder disposed between: the one of i) the body of the vehicle and ii) the pair of wheel holding portions; and one of the both ends of the stabilizer bar, the cylinder being configured to extend and contract in accordance with a) a rebound motion of one of the right and left wheels and a bound motion of the other of the right and left wheels and (b) a bound motion of the one of the right and left wheels and a rebound motion of the other of the right and left wheels, the cylinder including a first fluid chamber whose volume increases when the cylinder extends and decreases when the cylinder contracts and a second fluid chamber whose volume decreases when the cylinder extends and increases when the cylinder contracts;

an inter-chamber communication passage through which the first fluid chamber and the second fluid chamber communicate with each other; and at least one open/close valve functioning as the switch and disposed in the inter-chamber communication passage, each of the at least one open/close valve being configured to open the inter-chamber communication passage when placed in a valve open state and to close the inter-chamber communication passage when placed in a valve closed state;

wherein the controller controls the at least one open/close valve to selectively establish an inter-chamber non-communicating state in which the first fluid chamber and the second fluid chamber do not communicate with each other and an inter-chamber communicating state in which the first fluid chamber and the second fluid chamber communicate with each other, so as to switch the roll suppressing function between the effective state and the ineffective state.

\* \* \* \* \*